Patented Apr. 22, 1930

1,755,657

UNITED STATES PATENT OFFICE

OTTO LEUCHS, OF ELBERFELD, GERMANY, ASSIGNOR TO I. G. FARBENINDUSTRIE AKTIENGESELLSCHAFT, OF FRANKFORT-ON-THE-MAIN, GERMANY

CAUSTIC-SODA SOLUTION OF CELLULOSE

No Drawing. Application filed July 18, 1927, Serial No. 206,803, and in Germany July 30, 1926.

The present invention concerns the manufacture of solutions of cellulose in caustic alkalies by subjecting the cellulose to a preliminary treatment with acids, which treatment is interrupted, when the cellulose has become soluble in the alkali lyes without however having lost its structure or having become powdery or friable.

When cellulose is treated energetically with inorganic or organic acids hydrocelluloses are obtained, which are structureless or friable, possess a high degree of reducing power and are soluble in alkalies. By moderating the action of the acid and proceeding more carefully, the formation of hydrocellulose does not take place and the cellulose obtained after the treatment retains its exterior form, while its chemical composition remains unchanged.

The present invention concerns a process in which it is found advantageous, not to proceed with the action of the acid until hydrocellulose is formed, but to apply a much milder treatment. By such a preliminary attack the technically extremely valuable property is imparted to the cellulose that it has been rendered soluble in caustic alkalies, such as for example a 10% solution of caustic soda; the solution takes place smoothly in the cold, a clear solution resulting. From such solutions the cellulose can then be re-precipitated by appropriate treatment in the form of technically valuable films, threads and the like.

Thus, the novelty of the present process consists in subjecting cellulose to a preliminary mild treatment with acid until solubility in caustic alkali commences, after which the treated cellulose is dissolved in caustic alkalies.

Almost all inorganic or organic acids have proved suitable for the preliminary treatment, provided that the concentration, the duration of the treatment and the temperature are adjusted in accordance with the requirements of each individual acid. Thus, for example, the property of having been rendered soluble in caustic alkali is produced, if one part of cellulose in the form of cotton is heated under reflux with from 10 to 20 parts of from ½ to 1% sulphuric acid for some 4 to 6 hours. The duration of heating depends to some degree on the nature of the cellulose. Instead of boiling, as aforesaid, the cotton can also be covered with 15 to 30% sulphuric acid and allowed to stand at room temperature for from two to five days.

Of the organic acids, formic acid and acetic acid, among others, are especially suitable, either concentrated or diluted with water; for example, about 3 hours boiling with 75% acetic acid suffices to render cotton soluble in caustic alkali.

Instead of boiling, a treatment with acid vapors, such as for example, acetic acid vapor, may be resorted to. Obviously mixtures of inorganic and organic acids are likewise applicable. When a test portion indicates the commencement of complete solubility in alkali, any further action of the acid is interrupted, the cellulose is filtered off or centrifuged, washed free from the acid and dried, if desired.

The cellulose obtained is covered with 10 to 20 parts of 2.5 normal caustic soda lye, when after stirring and cooling to about $-5°$ C. a water clear, viscous solution is very soon obtained. After filtration, if desired, or required, the solution may be employed in the manufacture of films, threads and the like or also directly for impregnation purposes.

Under certain circumstances during heating with organic acids a trace of the acid may enter the cellulose in the form of an ester, in spite of which however the solubility is not impaired. Whenever necessary any contingent residue of acid may be removed by a previous treatment with quite dilute ammonia.

I claim:

As a new composition, a solution in which the solvent is a solution of about 10% caustic soda and in which the solute is re-precipitable cellulose.

In testimony whereof I have hereunto set my hand.

OTTO LEUCHS.